United States Patent [19]
Räsänen et al.

[11] Patent Number: 5,562,744
[45] Date of Patent: Oct. 8, 1996

[54] METHOD FOR TREATING PROCESS GAS

[75] Inventors: Kari Räsänen, Kangasala; Martti Pohja, Tampere, both of Finland

[73] Assignee: Enviropower Oy, Finland

[21] Appl. No.: 249,531

[22] Filed: May 26, 1994

[30] Foreign Application Priority Data

Jun. 11, 1993 [FI] Finland ................. 932701

[51] Int. Cl.⁶ ................. C10J 3/84; C10K 1/00
[52] U.S. Cl. ................. 48/197 R; 48/209
[58] Field of Search ................. 48/197 R, 206, 48/210, 209; 122/4 D; 165/104.16, 104.18; 252/373

[56] References Cited

U.S. PATENT DOCUMENTS

| | | | |
|---|---|---|---|
| 2,591,595 | 4/1952 | Ogerzaly | 48/210 |
| 2,621,113 | 12/1952 | Alther | 23/288 |
| 3,976,446 | 8/1976 | Sims | 48/210 |
| 3,980,451 | 9/1976 | McMahon | 48/197 R |
| 4,198,212 | 4/1980 | Tsao | 48/210 |
| 4,233,275 | 11/1980 | Kimura et al. | 48/210 |
| 4,613,344 | 9/1986 | Henrich et al. | 48/77 |
| 4,714,109 | 12/1987 | Tsao | 165/104.18 |
| 4,793,292 | 12/1988 | Engstrum et al. | 122/4 D |
| 4,865,625 | 9/1989 | Mudge et al. | 48/197 |
| 4,936,872 | 6/1990 | Brandl et al. | 48/197 |
| 5,213,587 | 5/1993 | Ekströn et al. | 48/197 |
| 5,226,475 | 7/1993 | Ruottu | 122/4 D |

FOREIGN PATENT DOCUMENTS

| | | |
|---|---|---|
| 1225818 | 8/1987 | Canada. |
| 310584 | 4/1989 | European Pat. Off.. |
| 901613 | 3/1990 | Finland. |
| 3340204 | 5/1985 | Germany. |
| 753975 | 8/1956 | United Kingdom. |
| 2180849 | 4/1987 | United Kingdom. |

OTHER PUBLICATIONS

European Search Report on European Patent Application EP 94 10 8891, Jan. 1995.
International Publication No. WO86/01822, Mar. 1986.

Primary Examiner—Peter Kratz
Attorney, Agent, or Firm—Dressler, Goldsmith, Milnamow & Katz, Ltd.

[57] ABSTRACT

The invention relates to a method for cooling and cleaning gases containing tar-like or other impurities, and to a reactor. In the method, process gas is first fed into a hot fluidized bed (4), where the tar-like impurities contained in it crack into smaller fractions, whereafter the process gas is passed onward, the fluidized bed material entrained in the process gas is separated from the process gas and returned through the cooler (8) into the fluidized bed and into the process gas stream, whereby the process gas cools under the influence of the cooled fluidized bed material. The reactor comprises a cooler (8) above the fluidized bed (4) and an annular conduit (7) outside the cooler (8), through which conduit the process gas flows into the upper portion of the reactor after the fluidized bed (4). It further comprises a fluidized grate (11) below the cooler (8), to which grate the cooled fluidized bed material from the cooler (8) drops, and from where the fluidized bed material is returned into the fluidized bed (4) and into the process gas stream by feeding the process gas to be treated into it as fluidizing gas.

10 Claims, 2 Drawing Sheets under a continuous influence of process gas containing tar-like compounds, prevents the tar-like compounds from getting into contact with the return conduit of fluidized bed material, where they might cool, deposit and thus block the flow.

METHOD FOR TREATING PROCESS GAS

The invention relates to a method for treating process gas formed in pressurized gasification of biomass, such as wood, and containing tar-like carbon compounds and possibly other impurities, wherein the process gas is passed through a fluidized bed consisting of a fluidized bed material of solid particles in such a way that the process gas is fed into a bubble bed zone in the lower portion of the fluidized bed, whereafter part of the fluidized bed material is carried along with the process gas stream, the fluidized bed material is separated from the process gas stream and returned into the fluidized bed, whereby the process gas acts as fluidizing gas in the fluidized bed, and the process gas is cooled by cooling the fluidized bed material.

The invention also relates to a reactor for treating process gas formed in pressurized gasification of biomass, such as wood, and containing tar-like carbon compounds and possibly other impurities, comprising an inlet conduit for feeding process gas to the lower portion of the reactor; an outlet conduit for removing process gas from the reactor; a fluidized bed consisting of a fluidized bed material of solid particles in the lower portion of the reactor, whereby the process gas entering a bubble bed zone in the lower portion of the fluidized bed is fed in such a way that it acts as fluidizing gas in the fluidized bed; separating means for separating fluidized bed material carried along with the process gas stream; at least one return conduit for returning fluidized bed material into the reactor; and a cooler for cooling the fluidized bed material and hence the process gas.

Process gases of different types, such as gases formed in the gasification of fuel, contain various impurities, such as tars, sulphur compounds, and alkali metal compounds. Similarly, process gas formed in pressurized gasification of biomass, especially wood, contains plenty of various tar-like carbon compounds. In view of the further processing and subsequent use of gases, it is usually necessary to remove impurities from the gases and, especially in the treatment of gases formed in gasification, to cool them to a temperature more suitable for their further processing. Gases are typically cooled in various fluidized bed and circulating fluidized bed reactors, where the fluidized bed is cooled by a separate cooling pipe assembly or the like while the gas is passed through the fluidized bed.

Finnish Patent 76 834 discloses a solution where a gas containing depositing components, such as tar, or other compounds, is cooled in a fluidized bed reactor. The purpose is to deposit tar and other compounds on a solid material placed in the reactor before they reach the cooling surfaces of the reactor. Japanese Patent Specification 52-5805 and U.S. Pat. No. 4,936,872 in turn disclose solutions where process gas is cooled by leading it through a cooled fluidized bed, and solid particles removed from the fluidized bed along with the gas are separated from the gas and returned into the reactor. A drawback common to the solutions of all these patent specifications is that process gases containing tar-like compounds cause clogging, because tar-like substances deposit on the cooling surfaces and conduits as the gas cools. In particular, such problems are caused by the fact that the cooling surfaces are positioned close to the gas inlet in the fluidized bed, and so these devices cannot be used efficiently in situations where process gas is obtained by gasifying fuel.

Furthermore, Finnish Patent Application 910 731 teaches a cooler based on the circulating fluidized bed principle, where gas is cooled by feeding it into the fluidized bed, which is fluidized by a separate fluidizing gas, and the cooling takes place by cooling the circulating fluidized bed material to be returned. This solution cannot be applied as such to process gas to be used as fuel, for instance, at a subsequent stage, as it does not allow addition of extra fluidizing gas for process technical reasons.

The object of the present invention is to provide a method and a reactor which allow process gas obtained in gasification to be cleaned and cooled efficiently.

The method according to the invention is characterized in that at least part of the fluidized bed material is catalytic, and that the temperature of the bubble bed zone is maintained such that the tar-like carbon compounds crack into lighter carbon compound fractions under the influence of the catalytic fluidized bed material in such a way that they are still in gaseous form on leaving the reactor at a temperature lower than their entry temperature.

The reactor according to the invention is characterized in that the fluidized bed material consists at least partially of a catalytic material under the influence of which the tar-like carbon compounds crack into lighter carbon compound fractions in such a way that they are still in gaseous form on leaving the reactor at a temperature lower than their entry temperature; that the cooler is mounted inside the reactor in the return conduit for fluidized bed material above the fluidized bed, whereby fluidized bed material separated from the process gas stream cools as it flows through the cooler; that a separate fluidized grate is provided below the cooler below a return opening of the bed material return conduit and above the fluidized bed, into which grate the returned cooled fluidized bed material drops and in which the fluidized bed material forms a plug preventing the process gas leaving the fluidized bed from flowing through the return opening into the return conduit; and that the reactor has a separate adjusting conduit for passing process gas onto the fluidized grate for passing the fluidized bed material positioned thereon to the upper surface of the fluidized bed and into the process gas stream leaving the fluidized bed.

An essential feature of the invention is that process gas is introduced into a fluidized bed consisting of a suitable catalyst material, such as dolomite, whereby the process gas simultaneously acts as fluidizing gas. At the same time any tar-like carbon compounds carried along with the gas are caused to crack at a high temperature under the influence of the catalyst contained in the fluidized bed into lighter carbon compounds so that they are still in gaseous form after the gas has cooled, and so they will not deposit on the cooling surfaces or cause clogging of the particle separator. Another essential feature of the invention is that the gas is cooled by cooling the solid particles entrained in the gas stream after the fluidized bed and separated from it, which solid particles are returned after cooling into the fluidized bed or partially also directly into the gas stream in the mixing zone positioned above the fluidized bed. Still another essential feature of the invention is that the returning of solid particles is controlled by a separate fluidized grate. Fluidization of solid particles contained in the grate and thus the flow of particles over the edges of the fluidized grate is controlled by feeding the same process gas into the fluidized bed, so that only process gas passes through the cooler.

The solution according to the invention allows tar-like compounds contained in a gas having a temperature as high as 900° C. and even more to be cracked especially when dolomite or another suitable lime material is used as solid particles in the fluidized bed while possible sulphur compounds react with lime at this temperature. Further, the gas cools as it flows through the fluidized bed, and the cooling increases drastically when the gas stream gets into contact with the cooled returned solid particles. A further advantage of the invention is that the separate fluidized grate, which is positioned below the cooler for solids and into which the cooled material is returned, is easy to adjust simply by adjusting the stream of fluidizing gas entering it in such a way that the stream of solid particles and thus the cooling of gas can be adjusted in a desired way. Still another advantage of the invention is that the device is compact in structure and does not require plenty of space in power plants.

The invention will be described more fully with reference to the attached drawings, in which FIG. 1 is a schematic cross-sectional view of a reactor according to the invention;

FIG. 3 is a schematic bottom view of an annular grate of the reactor shown in FIG. 2; and FIG. 4 is a schematic cross-sectional view of the reactor shown in FIG. 2 along the line 4—4.

Figure 1:
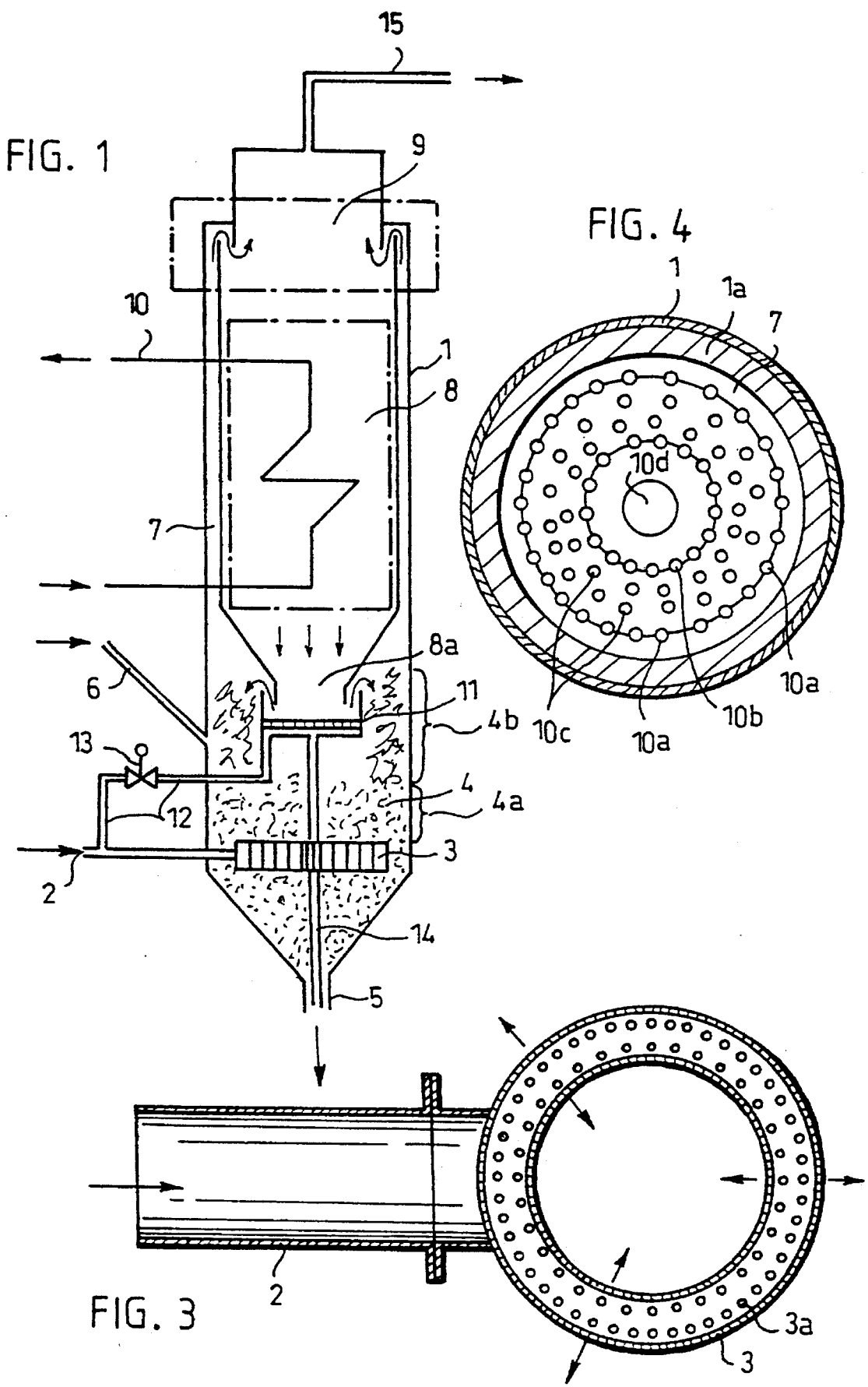

FIG. 1 shows schematically a reactor according to the invention, comprising an outer casing 1 and an inlet conduit 2 in its lower portion, through which conduit process gas is introduced. The inlet conduit 2 passes the gas to a grate 3, preferably an annular grate shown in more detail in FIG. 3. The grate 3 is positioned in the lower portion of the reactor, where there is a fluidized bed 4. The fluidized bed 4 consists of fluidized material, i.e. solid particles, preferably dolomite in connection with a process gas containing tar-like substances. The fluidized bed 4 is divided into two functionally different zones in the lower portion of the reactor, whereby the lower zone is a so-called bubble bed zone 4a, i.e. the area of high-density suspension, and the upper zone is a mixing zone 4b, which is the area of low-density suspension and in which the cooled fluidized bed material is mixed with the gas. Used material is removed from the fluidized bed 4 through an outlet conduit 5 in its lower portion, and fresh fluidized bed material is fed through an upper conduit 6. Gas from the grate 3 spreads into the fluidized bed 4, acting as fluidizing gas in it, and streams through the fluidized bed 4, thus carrying fluidized bed material along with it. Above the fluidized bed the gas is passed into a narrow annular conduit 7, i.e. into a rising section, where the gas cools further as a cooler 8 is provided in a return conduit centrally in the conduit 7. The process gas and the fluidized bed material flow through the annular conduit 7 up to the upper portion of the reactor, where the fluidized bed material is separated from the gas by separating means 9, i.e. in a manner known per se by utilizing various flow arrangements 9a, cyclones, or other suitable prior art solutions. The process gas then flows onwards through an outlet conduit 15, while the fluidized bed material drops into the cooler 8, where it is cooled by a cooling pipe assembly 10. In the cooler 8 the fluidized bed material flows slowly downwards, forming a slowly downwardly moving solid particle bed in the return conduit, until it reaches a fluidized grate 11 forming a gas lock in a return opening 8a. Fluidized bed material on the fluidized grate 11 prevents the process gas from flowing into the cooler 8 and upward therethrough, as it forms a plug between the interior of the cooler and the fluidized bed space. Cooled fluidized bed material can be removed from the fluidized grate 11 by introducing process gas through an adjusting conduit 12 to the fluidized grate 11 by regulating a valve 13. The process gas entering this way causes cold bed material to flow over the edges of the fluidized grate 11 so that it flows into the fluidized bed 4 and cool it, while part of the cold fluidized bed material is mixed within the mixing zone 4b with the process gas stream, thus cooling it and being carried along with it through the conduit 7 back into the upper portion, being thus returned into the cooler 8.

On emerging from the gasifier the process gas to be introduced into the reactor has a temperature of about 800° to 1,000° C., and it contains various tar-like carbon compounds and possibly evaporated alkali metal compounds and sulphur compounds, which have to be removed from the gas irrespective of the use. In a normal reactor used in connection with pressurized gasification, the pressure of the process gas is typically 20 to 30 bar, but the reactor may also operate at normal atmospheric pressure and even at a higher pressure, i.e. typically within the range from 1 to 50 bar. Of course, the pressure tolerance and the structures of the reactor have to be designed appropriately according to the application. When the gas enters the fluidized bed 4 within the area of high-density suspension, i.e. within the bubble bed zone 4a, dolomite acting as fluidized bed material in the fluidized bed also acts as a catalyst and causes the heavy tar-like carbon compounds to crack into lighter carbon compound fractions, whereby they will not form sticky tar-like depositions on the surface of the cooler or the conduits when the gas cools to e.g. about 300° to 600° C., but are removed while still in gaseous form together with the other gases e.g. for further burning. The temperature of the fluidized bed and thus that of its bubble bed zone 4a can be maintained suitable by means of cooled fluidized bed material returned into it, whereby the cooled fluidized bed material is mixed with the warmer material when the bubble bed moves, thus cooling the bubble bed. The cooling effect can be varied by adjusting the amount of fluidized bed material circulating through the cooler by the gas stream of the fluidized grate 11. Moreover, sulphur compounds entrained in the gas are able to react with dolomite at the above-mentioned high temperature, thus forming compounds of lime and sulphur, which can be removed through the outlet conduit 5. Alkali metal compounds in turn are deposited on the surface of the fluidized bed particles. During the operation of the device, coarse fluidized bed material is gradually accumulated in the lower portion of the reactor, wherefrom it is removed, when required, through the outlet conduit 5, while fresh fine fluidized bed material is fed through the conduit 6. Dolomite particles that have ground fine are removed from the return conduit 8a through a second outlet conduit 14.

Figure 2:
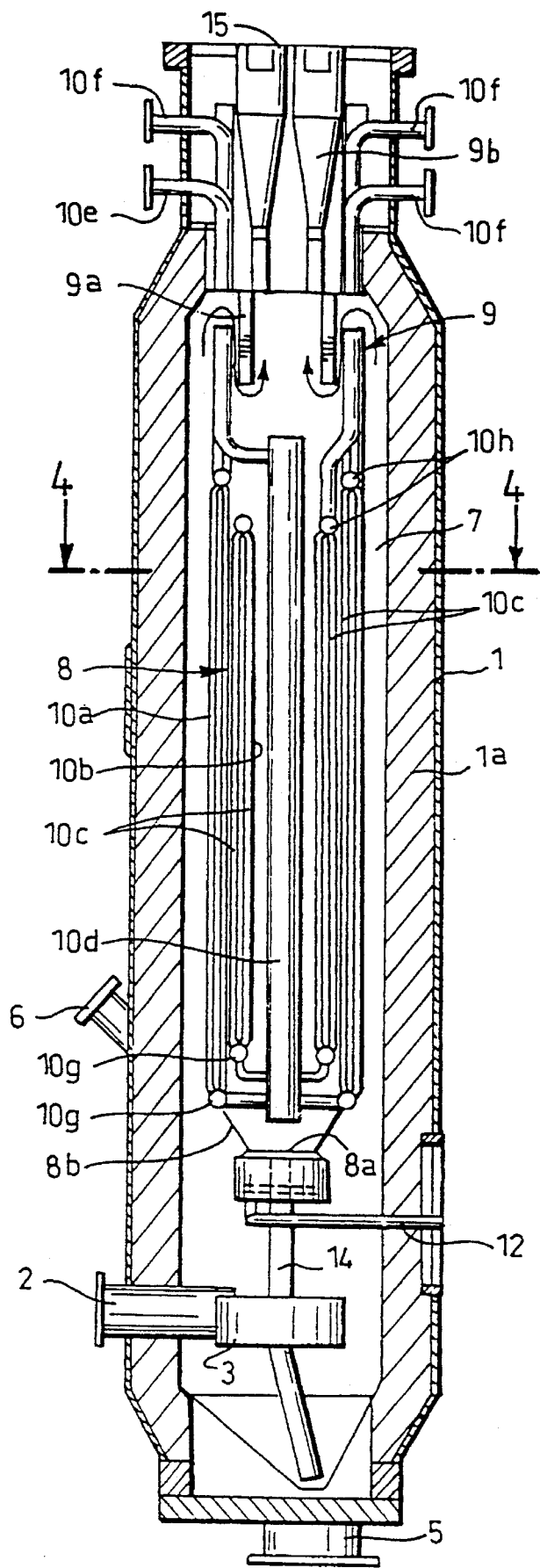
FIG. 2 is a sectional view of a preferred embodiment of the reactor according to the invention.

FIG. 2 is a sectional view of a preferred embodiment of the reactor according to the invention, where the same reference numerals as in FIG. 2 have been used for corresponding parts. In this reactor, as shown more clearly in FIG. 3, the cooler 8 in the return conduit is formed of vertical cooling pipes 10a to 10c, and a central water feed conduit 10d is provided, through the upper end of which water is supplied from an inlet connection 10e into the cooler 8 and therethrough to the lower end of the cooling pipes 10a to 10c. When the water flows upward through the pipes 10a to 10c, it warms up and is evaporated due to the high temperature of the fluidized bed material, whereby it is removed in the form of steam through one or more outlet connections 10f. In this embodiment, a brick masonry 1a is provided between the casing 1 and the conduit 7. This reactor is designed to operate at a pressure of about 20 to 30 bar, wherefore its outlet and inlet connections, walls and structures are designed accordingly. The water feed conduit 10d is connected to the cooling pipes 10a to 10c by annular conduits 10g so that water is distributed into all pipes suitably evenly. Furthermore, the cooling pipes 10a to 10c are connected at the upper end to annular conduits 10h and further through them to the outlet connections 10f. A conical guide means 8b forming a return opening 8a is provided at the lower end of the cooler 8. The upper end of the guide means is connected in a gas-tight manner to the outermost and bottommost annular conduit 10g in such a way that a fin wall formed by the outermost cooling pipes 10a defines together with the cone 8b an integral outer casing for the return conduit and the cooler. The separating means 9 for the removal of fluidized bed material from the process gas comprise first, as seen in the direction of flow of the process gas, flow controllers 9a and one or more cyclones 9b in the upper portion of the reactor 1. Gas purified from particles is removed from the reactor through the conduit 15.

FIG. 3 shows schematically one embodiment of the gas grate 3 of the reactor shown in FIG. 2. In this embodiment, which is fairly advantageous in practice, the gas grate 3 is annular in structure. The annular grate is formed by an annular conduit having gas supply openings 3a suitably spaced on its lower surface and outer and inner surfaces in such a manner that the process gas will be distributed as evenly as possible throughout the fluidized bed of the reactor. The gas is introduced into the grate 3 through the conduit 2.

FIG. 4 in turn is a cross-sectional schematic view of the reactor shown in FIG. 2 along the line 4—4. It appears from the figure how the cooling pipe assembly 10 is positioned within the reactor casing 1. The cooling pipe assembly is formed by the fin pipes 10a positioned inside the casing so as to form an integral, solid cooling surface cooled by a suitable cooling fluid, preferably water, flowing through the pipes 10a. The innermost layer of the cooling pipe assembly 10 is similarly formed of the fin pipes 10b defining an integral tight wall surface, whereby the separate cooling pipes 10c, which are not interconnected by fins, remain between the pipes 10a and 10b. The water feed conduit 10d runs centrally within the inner fin pipe assembly 10b in the vertical direction of the reactor. Cooling fluid, usually water, is passed through the feed conduit into the lower portion of the cooler 8, from where it returns through the pipes 10a to 10c into the upper portion of the cooler 8, from where it is then removed. Under its normal operating conditions the water used for cooling the fluidized bed material is evaporated so that merely steam is discharged through the outlet connections.

The invention has been described above and shown in the drawings by way of example. The structure of the cooler 8 and the pipe assembly can be realized in many different ways, depending e.g. on cooling fluids used, temperatures, fluidized bed material, etc. Means provided in the upper portion of the cooling reactor for separating fluidized bed material may be realized in different ways known per se. Gas supply to the fluidized grate acting as a gas lock can be arranged in different ways by using e.g. a perforated gas bottom, annular nozzles or some other means allowing the cooled fluidized bed material flown through the cooler 8 to be fluidized and thus passed at a desired velocity over the edges of the fluidized grate into the fluidized bed and into the process gas to be cooled. The conduit 7 need not be annular, and it may be replaced e.g. with one or more pipes leading from the fluidized bed 4 into the upper portion of the reactor so that the fluidized bed material can be separated from the gas and returned through the cooler.

We claim:

1. Method for treating process gas formed in pressurized gasification of biomass, the process gas containing impurities including relatively heavy carbon compounds, wherein the process gas is passed through a fluidized bed consisting of a fluidized bed material of solid particles in a reactor, at least part of the fluidized bed being catalytic, in such a way that the process gas is fed as a stream into a bubble bed zone in a lower portion of the fluidized bed, whereafter part of the fluidized bed material is carried along with the process gas stream, separated from the process gas stream, cooled, and returned into the fluidized bed, whereby the process gas alone acts as a fluidizing gas in the fluidized bed, wherein the process gas enters the reactor at an entry temperature and is cooled in the reactor by cooling the fluidized bed material separated from the process gas stream, wherein the separated fluidized bed material is fed into the process gas stream leaving the fluidized bed within a mixing zone in an upper portion of the fluidized bed and to the upper surface of the fluidized bed, via a bed material return conduit, onto a fluidized bed grate located above the bubble bed zone and arranged to prevent process gas from entering the bed material return conduit and wherein the temperature of the bubble bed zone remains sufficiently high that such relatively heavy carbon compounds crack into lighter carbon compound fractions, under the influence of the catalytic fluidized bed matarial, in such a way that said lighter carbon compound fractions leave the reactor in gaseous form at a temperature lower than the entry temperature.

2. Method according to claim 1, wherein the temperature of the bubble bed zone is adjusted by adjusting the cooled fluidized bed material flow to be returned into the fluidized bed.

3. Method according to claim 1, wherein the fluidized bed material is cooled by a cooler positioned in the return conduit for the bed material.

4. Method according to claim 1, wherein the process gas is cooled substantially within the mixing zone.

5. Method according to claim 1, wherein the fluidized bed material separated from the process gas is returned through the bed material return conduit, which has a return opening, onto the fluidized bed grate positioned below the return opening of the bed material return conduit, whereby a layer of fluidized bed material forming on the fluidized bed grate prevents the process gas leaving the fluidized bed from flowing through the return opening into the bed material return conduit, and wherein a stream of separated fluidized bed material is moved from the fluidized bed grate to the upper surface of the fluidized bed and into the process gas stream by feeding a separate process gas stream to the fluidized grate through a separate adjusting conduit, whereby adjustment of the stream of separated fluidized bed material away from the fluidized bed grate and hence adjustment of the fluidized bed material carried along with the process gas and cooling of the process gas.

6. Method according to claim 1, wherein the catalytic material consists of lime particles.

7. Method according to claim 1, wherein the process gas is fed into the fluidized bed at a temperature of 800°–1,000° C., and the process gas is cooled in the reactor to 300°–600° C.

8. Method according to claim 1, wherein the pressure of the process gas in the reactor is 1–50 bar.

9. Method according to claim 6, wherein the lime particles are dolomite.

10. Method according to claim 8, wherein the pressure of the process gas is 20–30 bar.

* * * * *